June 29, 1965 W. SCHLUTER 3,191,228
APPARATUS FOR MAKING THERMOPLASTIC TILES WITH COLOR EFFECTS
Filed Jan. 11, 1962
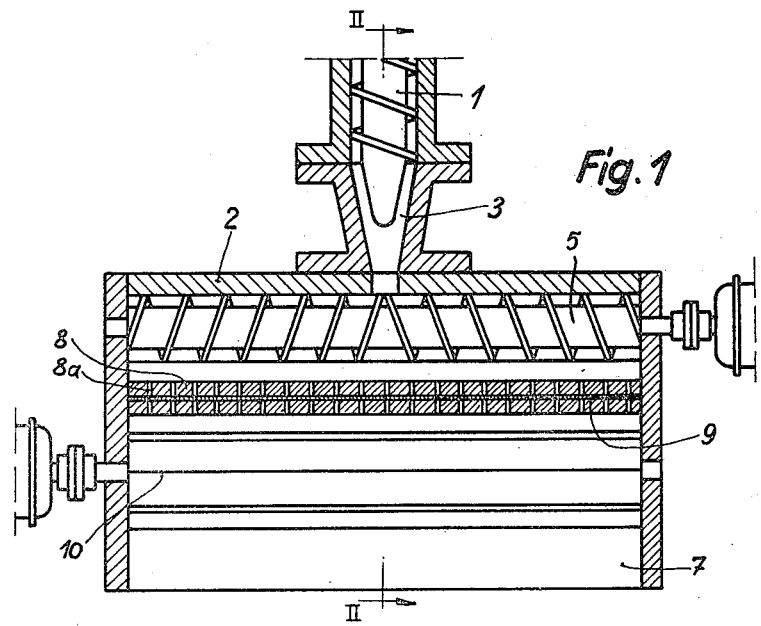
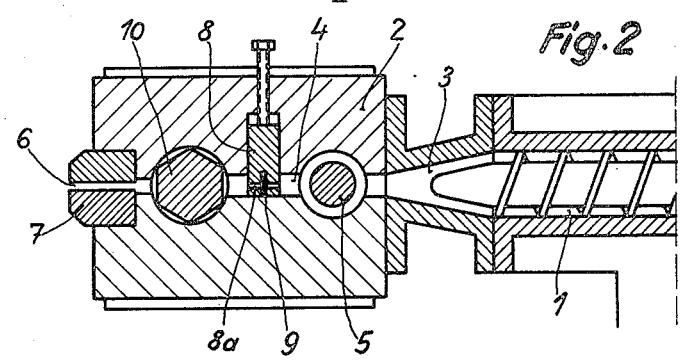
INVENTOR.
WERNER SCHLUTER
BY
ATTORNEYS

United States Patent Office 3,191,228
Patented June 29, 1965

3,191,228
APPARATUS FOR MAKING THERMOPLASTIC
TILES WITH COLOR EFFECTS
Werner Schluter, Burgdorferdamm 35,
Hannover, Germany
Filed Jan. 11, 1962, Ser. No. 165,519
Claims priority, application Germany, Mar. 23, 1961,
B 61,835; May 26, 1961, B 62,651
5 Claims. (Cl. 18—12)

This invention relates to apparatus for extruding thermoplastic tiles with color effects, and more particularly to an improved slot die worm extruder.

It has been known, heretofore, to extrude thermoplastics through a slot die by means of a worm extruder and to achieve color effects in the tiles by intermittently adding batches of different colored thermoplastics. The difficulty with these prior art methods of extruding thermoplastic through a slot die by a worm extruder is that in continuous production no uniformity in the color pattern of multicolored tiles, such as floor tiles, can be achieved.

Accordingly, it is an object of this invention to provide improved apparatus for producing by extrusion colored patterns in theromplastic tiles.

It is another object of this invention to provide apparatus for producing uniform color patterns in thermoplastic tiles which are extruded through slot dies by worm extruders.

In accordance with a preferred embodiment of the invention, a sieve or screen is interposed between the extruder worm and the slot die channel to cause a gradual erosion of the granulated color pigments by the thermoplastic material as it flows through the die. The sieve or screen is preferably in the form of a baffle beam which is provided with a plurality of holes and the sieve or screen is mounted on the beam and extends over the opening of the holes. The sieve is mounted to be movable transversely of the direction of flow of the thermoplastic material.

The hard granulated color pigments which are mixed with thermoplastic material, such as polyvinyl chloride, remain suspended on the sieve as the softened thermoplastic flows through the holes of the sieve. The granules of pigment are slowly eroded by the movement of the thermoplastic material and a stripe is thus formed in the tile. By choosing different sizes of granulations of the color pigments, the melting time of the granules can be changed to form either short or long stripes in the tile. A striped pattern such as is produced by this invention is known as a speckled effect.

A distributing worm, extending transversely of the extruding worm distributes the raw material across the width of the die. A secondary shaft which is mounted between the sieve and the slot die provides a very fine distribution and mixing of the materials and an even extrusion through the slot die channel. The secondary shaft, which may have a hexagonal cross section, has no torsional elements. The material flowing over this secondary shaft thus does not experience any twist which would cause an uneven distribution of material. The secondary shaft rotates independently of the distributing shaft and the thermoplastic material is moved around the circumference of the secondary shaft in a direction at right angles to the axis of the shaft. This assures an even distribution of the thermoplastic material. The secondary shaft thus obliterates any irregularities in the surface of the tile which may be caused by the feeding worm. Also, by a change in the peripheral speed of the secondary shaft, it is possible to affect the smoothness of the tile. The speeds of rotation of the extruder and distributing worms can be changed to increase or decrease the compression and to improve the gelation of the thermoplastic material. Experiments have shown that the screen or sieve causes formation of stripes across the tile while the secondary shaft affects the color pattern of the tile in the transverse direction.

Deeply cut worms in the worm extruder prevent a premature mixing of the thermoplastic with the pigment granules, so that the granules are melted or eroded only on the surface of the sieve. Other effects can be achieved by imparting horizontal or vertical movements to the sieve which extends at right angles to the axis of the extruder worm.

This preferred embodiment of the invention is illustrated in the accompanying drawing, in which:

FIGURE 1 is a cross-sectional view through the end of the extruder worm and slot die of this invention;

FIGURE 2 is a cross-sectional view along the line II—II of FIGURE 1; and

FIGURES 3 to 6 are cross-sectional views of modified forms of the secondary shaft.

Referring to FIGURES 1 and 2, a slot die 2 for extruding tiles is secured to the end of an extruder worm 1. The extruder worm 1 feeds the raw materials to the die through a channel 3. A distributor worm 5 distributes the materials across the whole width of the die without increasing the pressure on the materials. The materials then flow through the channel 4 to a die channel 6 in a die block 7. Between the die block 7 and the distributor worm 5, a sieve device causes a gradual melting or erosion of the hardenable pigmented color concentrates shortly before the emergence of the tile from the die block 7. The sieve may be formed in many different ways, but in the design shown in the drawing, a baffle beam 8 is provided with a plurality of holes 8a in the lower part of the beam which extend through the baffle beam. A sieve 9 is inserted in the lower part of the baffle beam 8 and extends across the holes 8a of the sieve. The sieve 9 holds back the hard pigmented concentrates so that they gradually melt and form stripes on the tile which is being produced. The baffle beam is movably mounted transversely of the extruder worm and various color designs can be produced by moving the beam as the tiles are extruded.

A secondary shaft 10 is provided between the sieve 9 and the die channel 6. The secondary shaft disrupts or shears the stripes of color in the thermoplastic against the slot die 2. As shown in FIGURES 1 and 2, the secondary shaft 10 has a hexagonal cross section. The shaft 10 may also have helically arranged discs or eccentric discs arranged in staggered relation to one another or one of the modified forms shown in FIGURES 3 to 6.

The secondary shaft 10 and the distributor worm 5 are rotated independently of each other and the secondary shaft 10 causes a constant tearing off of the color stripe. The secondary shaft 10 also provides a fine distribution and an even extrusion of the plastics material from the slot die 2.

It is important that the part of the baffle beam which penetrates into the die channel be provided with a plurality of bore holes. These bore holes are covered by a sieve, or rather they are interspersed with the sieve. It is also possible within the framework of this invention to provide a baffle strip having holes and a sieve, and to connect the baffle up to a non-perforated baffle beam in some suitable manner. Downstream from the baffle beam the individual filaments which develop as a result of the plurality of holes can coalesce again.

In a modified form of the invention, a conveyer screw may be provided between the sieve and the die channel.

The conveyer screw mixes the color stripes and accomplishes a fine distribution of the color throughout the thermoplastic material. It also contributes to the even extrusion of the material through the die channel.

As in the case of non-slot dies, it often occurs that too much material is taken away from the middle of the slot die by the distributing worm and tile is extruded having an uneven thickness. Also, wave curves may occur which mark surface of the tile. The secondary shaft 10 overcomes these difficulties by providing a very fine distribution of the material as well as an even extrusion of the material through the slot die. Tiles of different widths can be produced by this device by using only a portion of the width of the die slot.

While this invention has been illustrated and described in one embodiment, it is recognized that variations and changes may be made therein without departing from the invention as set forth in the claims.

I claim:

1. Apparatus for attachment to an extruder worm for extruding polyvinylchloride or other thermoplastic materials comprising a die housing having an opening therein, an extrusion die, conduit means communicating between said opening and said die, coarse distributing means including a screw extending along said die adjacent said worm, fine distributing means including a shaft extending along said die adjacent thereto, said coarse and fine distributing means being in said conduit means, a sieve, and means mounting the sieve in said passageway between said screw and said shaft, said screw and said shaft being substantially parallel to said die, whereby uniform tiles are extruded from the die.

2. Apparatus for extruding polyvinylchloride or other thermoplastic material comprising an extruder worm, a die housing an elongated extrusion die, conduit means in said housing communicating between said worm and said die, a screw extending along said die adjacent said worm, means for rotating said screw, a shaft extending along said die adjacent thereto, said shaft having plane surfaces thereon, means for rotating said shaft, said screw and shaft being in said conduit means, a sieve, and means mounting the sieve in said passageway between said screw and said shaft, said screw and said shaft being substantially parallel and coextensive with said die, whereby uniform tiles are extruded from the die.

3. Apparatus for extruding polyvinylchloride or other thermoplastic material comprising an extruder worm, a die housing, an extrusion die having an elongated slot, said die being secured in one side of said die housing, the opposite side of said die housing being secured to said extruder worm, means forming a passageway through said die housing and communicating between said worm and said die, a screw mounted in said passageway adjacent said worm, means for rotating the screw, a shaft mounted in said passageway adjacent said die, a sieve, means mounting the sieve in said passageway between said screw and said shaft, and means for rotating said shaft, said screw and said shaft being substantially parallel to said slot.

4. Apparatus for extruding polyvinylchloride or other thermoplastic material comprising an extruder worm, a die housing, an extrusion die having an elongated slot, said die being secured in one side of said die housing, the opposite side of said die housing being secured to said extruder worm, means forming a passageway through said die housing and communicating between said worm and said die, a screw mounted in said passageway adjacent said worm, means for rotating the screw, a shaft mounted in said passageway adjacent said die, means in the conduit between said screw and said shaft for dividing said material into a plurality of streams, and means for rotating said shaft, said shaft having a plurality of plane surfaces thereon, said screw and said shaft being substantially parallel to said slot.

5. Die apparatus comprising a die housing, an extrusion die having an elongated slot, means for securing said die in one side of said die housing, the opposite side of said die housing having an opening therein, means forming a passageway through said die housing and communicating between said opening and said die, a screw mounted in said passageway adjacent said opening, means for rotating the screw, a shaft mounted in said passageway adjacent said die, means for rotating said shaft and said screw, said screw and said shaft being substantially parallel and coextensive with said slot, a sieve, and means mounting the sieve in said passageway between said screw and said shaft.

References Cited by the Examiner

UNITED STATES PATENTS

| 1,701,832 | 2/29 | Welton | 18—2 |
|---|---|---|---|
| 2,022,895 | 12/55 | Morrell. | |
| 2,262,989 | 11/41 | Conklin et al. | |
| 2,491,507 | 12/49 | Lyon. | |
| 2,688,769 | 9/54 | Corbett | 18—12 |
| 3,063,095 | 11/62 | Limback | 18—12 |
| 3,137,895 | 6/64 | Kusch | 18—12 |

FOREIGN PATENTS

| 615,177 | 2/61 | Canada. |
|---|---|---|
| 1,248,798 | 11/60 | France. |

MICHAEL V. BRINDISI, *Primary Examiner.*